(12) United States Patent
Ouchi et al.

(10) Patent No.: US 8,862,466 B2
(45) Date of Patent: Oct. 14, 2014

(54) SPEECH INPUT DEVICE, SPEECH RECOGNITION SYSTEM AND SPEECH RECOGNITION METHOD

(75) Inventors: Kazushige Ouchi, Saitama (JP); Miwako Doi, Kawasaki (JP); Ryohei Orihara, Itabashi-ku (JP); Daisuke Yamamoto, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/209,618

(22) Filed: Aug. 15, 2011

(65) Prior Publication Data

US 2011/0301950 A1    Dec. 8, 2011

Related U.S. Application Data

(63) Continuation of application No. PCT/JP2009/069642, filed on Nov. 19, 2009.

(30) Foreign Application Priority Data

Mar. 18, 2009   (JP) ................... 2009-066659

(51) Int. Cl.
| | | |
|---|---|---|
| G10L 15/00 | (2013.01) | |
| G10L 15/28 | (2013.01) | |
| H04R 1/08 | (2006.01) | |
| G10L 25/78 | (2013.01) | |

(52) U.S. Cl.
CPC ............. *G10L 15/28* (2013.01); *H04S 2400/15* (2013.01); *H04R 1/08* (2013.01); *H04R 2499/11* (2013.01); *G10L 25/78* (2013.01)
USPC ........................................ 704/231; 704/275

(58) Field of Classification Search
USPC .......................................................... 704/246
See application file for complete search history.

(56) References Cited

U.S. PATENT DOCUMENTS

| | | | | |
|---|---|---|---|---|
| 4,119,797 A | * | 10/1978 | Wollert | 381/110 |
| 5,818,949 A | * | 10/1998 | Deremer et al. | 381/172 |
| 2008/0214360 A1 | * | 9/2008 | Stirling et al. | 482/9 |
| 2010/0009667 A1 | * | 1/2010 | Hasegawa | 455/418 |

FOREIGN PATENT DOCUMENTS

| | | | |
|---|---|---|---|
| JP | 07-307989 | | 11/1995 |
| JP | 2004-198831 | * | 7/2004 |
| JP | 2005-229420 | | 8/2005 |
| JP | 2005-311418 | | 11/2005 |
| JP | 2007-214913 | | 8/2007 |
| JP | 2008-051882 | * | 3/2008 |

OTHER PUBLICATIONS

International Search Report for International Application No. PCT/JP2009/069642 mailed on Feb. 9, 2010.

(Continued)

*Primary Examiner* — Jialong He
*Assistant Examiner* — Jie Shan
(74) *Attorney, Agent, or Firm* — Amin, Turocy & Watson, LLP

(57) ABSTRACT

A device for speech input includes a speech input unit configured to convert a speech of a user to a speech signal; an angle detection unit configured to detect an angle of the speech input unit; a distance detection unit configured to detect a distance between the speech input unit and the user; and an input switch unit configured to control on and off of the speech input unit based on the angle and the distance.

8 Claims, 13 Drawing Sheets

(56) References Cited

OTHER PUBLICATIONS

Written Opinion for International Application No. PCT/JP2009/069642 mailed on Feb. 9, 2010.

Japanese Office Action for International Application No. PCT/JP2009/066659 mailed on Apr. 23, 2013.

* cited by examiner

| BRING LIPS CLOSE TO MICROPHONE |
|---|
|  |

| SEPARATE LIPS FROM MICROPHONE A LITTLE |
|---|
|  |

| HEADER | DATA LENGTH | COMMAND | CHECK SUM |

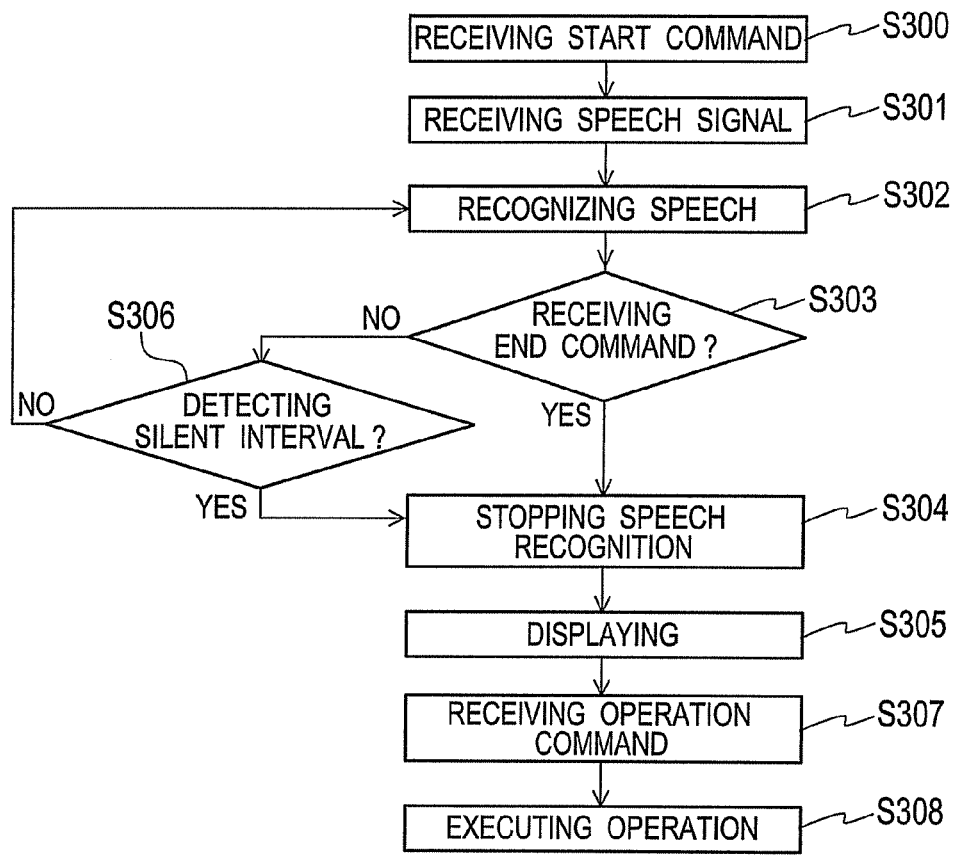

US 8,862,466 B2

SPEECH INPUT DEVICE, SPEECH RECOGNITION SYSTEM AND SPEECH RECOGNITION METHOD

CROSS REFERENCE TO RELATED APPLICATIONS

This is a continuation application based on PCT application No. PCT/JP2009/69642 filed on Nov. 19, 2009, which claims the benefit of priority from JP 2009-066659 filed on Mar. 18, 2009; the entire contents of which are incorporated by reference herein.

FIELD

Embodiments described herein relate generally to a speech input device, a speech recognition system and a speech recognition method.

BACKGROUND

A voice recorder is one of devices for recoding speech. The voice recorder continuously records sounds around a microphone as voice on a recording operation. Thus recorded data is used subsequently to hear a playback of a recording as it is. A user is required to instruct the voice recorder to start and to stop the recording by a button operation.

On the other hand, speech recognition techniques for recognizing input speech of a microphone and converting into text data are widely used. For the speech recognition techniques, there are an isolated word recognition technique and a connected speech recognition technique. Both of techniques intend to develop various services by checking input speech data using a speech recognition dictionary which is preliminarily created, and automatically converting into a text having the highest likelihood.

Generally, for on/off control of speech recognition, a press-to-talk method and a push-to-talk method are used. In the press-to-talk method, a button for on/off control is required to be pressed down during speech input. In the push-to-talk method, only starting of speech input is instructed by pushing down a button for on/off control, and stopping of the speech input is automatically executed by detecting a silent interval by the speech recognition system. With either methods, on the occasion of speech input, the user must instruct the system by button operation. For the user, there are problems that the button operation is troublesome and that it is difficult to push down the button with a suitable timing until the user is accustomed.

Consequently, a method has been proposed in which, by placing the microphone other than the operation side, speech input is automatically turned on when detecting that the microphone side is turned upward at the occasion of speech act. However, when speech input is switched on and off only by the basis of the orientation of the microphone side, the microphone side is required to be turned to a different direction from the upward direction in order to stop the speech input. Also, while the microphone side is upward, the on state of the speech input continues.

Moreover, as a problem of the speech input device of a handheld type, such as a remote controller and the like, a microphone gain and a speech recognition parameter may not be suitably tuned because a distance between lips of the user and the microphone is different depending on the user. In this regard, it is thought of as one of reasons why a speech recognition accuracy using the handheld type microphone is lower as compared with a head set type microphone.

BRIEF DESCRIPTION OF THE DRAWINGS

FIGS. 21 and 22 are diagrams showing examples of display contents of the display unit according to the modification of the second embodiment; and FIG. 23 is a flowchart showing an example of a method for speech recognition according to modification of the second embodiment.

DETAILED DESCRIPTION

Figure 1:
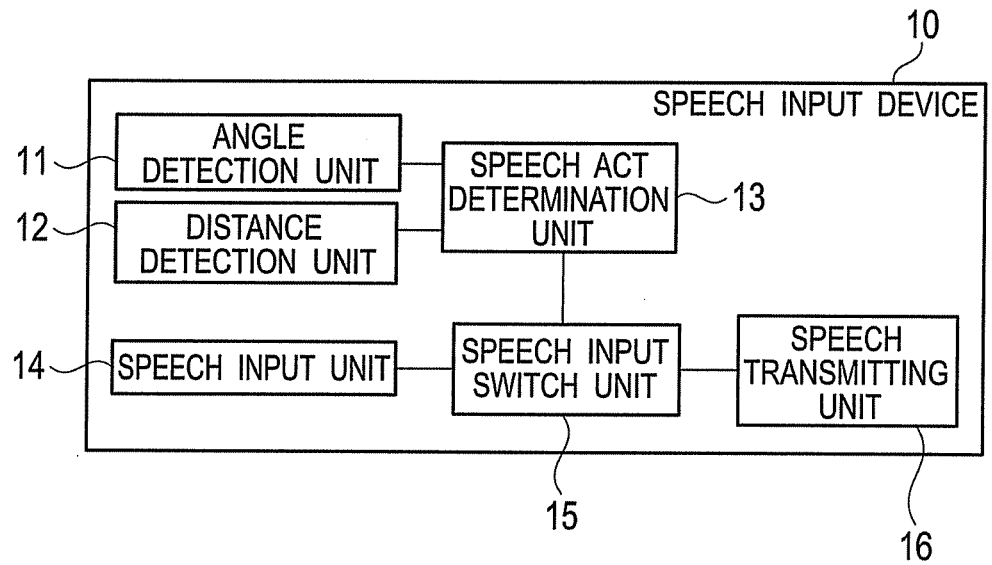
FIG. 1 is a block diagram showing an example of a speech input device according to a first embodiment.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

According to embodiments, a device for speech input is provided, which includes a speech input unit configured to convert a speech of a user to a speech signal; an angle detection unit configured to detect an angle of the speech input unit;

a distance detection unit configured to detect a distance between the speech input unit and the user; and an input switch unit configured to control on and off of the speech input unit based on the angle and the distance.

(First Embodiment)

As shown in FIG. 1, a speech input device 10 according to a first embodiment of the present invention includes an angle detection unit 11, a distance detection unit 12, a speech act determination unit 13, a speech input unit 14, a speech input switch unit 15 and a speech transmitting unit 16. The speech input unit 14 converts a speech of a user into a speech signal. The angle detection unit 11 detects an angle of the speech input unit 14. The distance detection unit 12 detects a distance between the speech input unit 14 and lips of the user. The speech act determination unit 13 determines beginning and ending of a speech act of the user based on the detected angle and distance. The speech input switch unit 15 controls on and off of the speech input unit 14 based on output of the speech act determination unit 13. The speech transmitting unit 16 transmits the speech signal provided from the speech input unit 14 to an external device.

Figure 2:
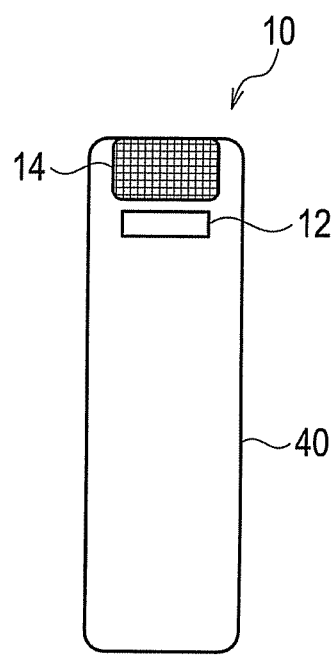
FIG. 2 is a diagram showing an example of installation of the speech input device according to the first embodiment.
Figure 3:
FIG. 3 is a schematic diagram showing an image of the speech input device in use according to the first embodiment.

The speech input device 10 is installed in an enclosure 40, as shown in FIG. 2. The distance detection unit 12 and the speech input unit 14 are disposed on a top surface of the enclosure 40. The angle detection unit 11, the speech act determination unit 13, the speech input switch unit 15, the speech transmitting unit 16 and the like are disposed internally in the enclosure 40. As shown in FIG. 3, the user holds the speech input device 10 in hand and speak toward the speech input unit 14.

For the angle detection unit 11, an angle detector, such as an acceleration sensor, a mechanical tilt sensor, and the like may be used. For example, in the case of the acceleration sensor, an angle may be detected by measuring a gravitational acceleration (1 G) applied to directions of detection axes of the acceleration sensor. The angle of the speech input device 10 may be detected using at least one of the detection axes of the acceleration sensor.

Figure 4:
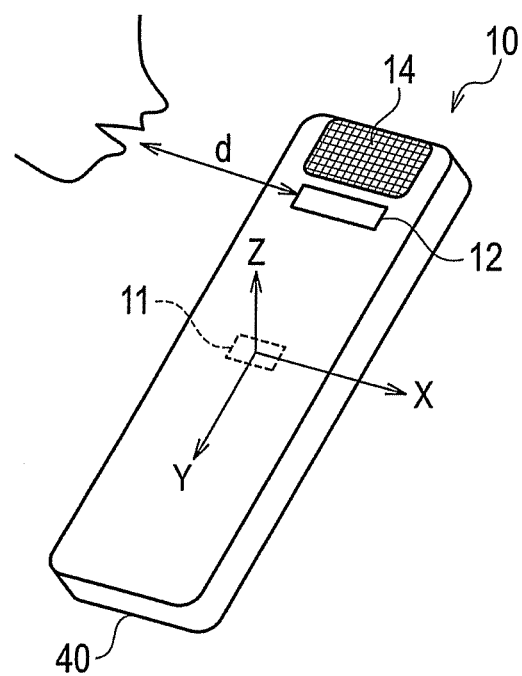
FIG. 4 is a schematic diagram used in an explanation of the angle detection unit and distance detection unit implemented in the speech input device according to the first embodiment.

Description will be given using a case in which a 3-axis acceleration sensor is built in as the angle detection unit 11. As shown in FIG. 4, in the top surface of the speech input device 10, X and Y axes are defined in parallel and orthogonal directions to the speech input unit, respectively, and a Z axis is defined in a direction perpendicular to the top surface of the speech input device 10. In the angle detection unit 11, the angle with respect to the lips of the user may be detected by measuring the angle of the Y axis or Z axis with respect to the gravitational acceleration (vertical direction).

Figure 5:
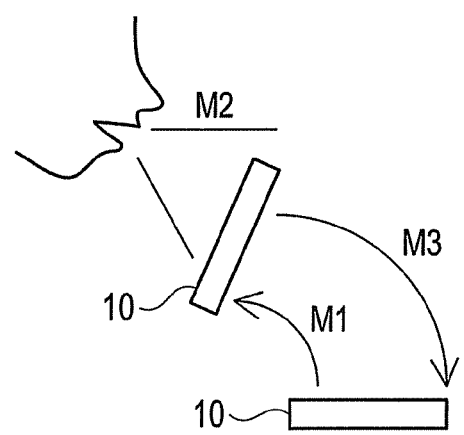
FIG. 5 is a schematic diagram used in an explanation of operations for detecting the angle of the speech input device according to the first embodiment.
Figure 6:
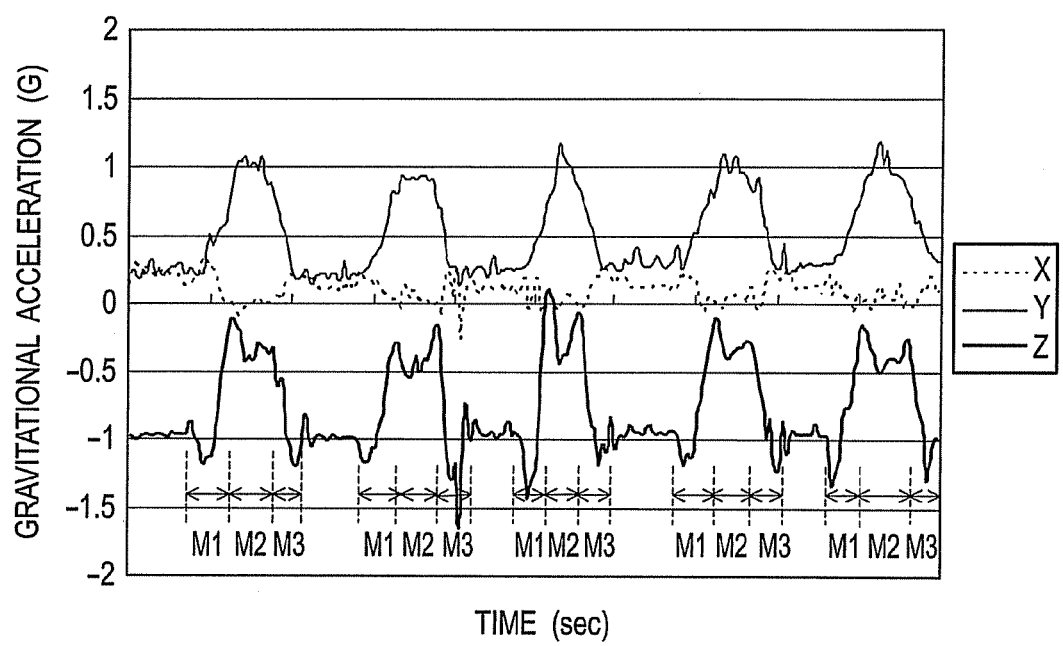
FIG. 6 is a graph showing an example of measurement result of the angle detection according to the first embodiment.

As shown in FIG. 5, a series of movements of the speech input device 10 shown in FIG. 4, which includes an operation interval M1 to bring closer to the lips by the hand from a horizontal position; an operation interval M2 of speech act; and an operation interval M3 to return to the initial position after the speech act, have been sequentially repeated for five times. FIG. 6 shows output waveforms of the 3-axis acceleration sensor used as the angle detection unit 11 in each of the operation intervals. It is understood that the gravitational acceleration associated with the series of the operations extremely changes in the Y axis direction and the Z axis direction, as compared with the X axis direction. For example, when the Z axis direction is used to detect the angle, the speech act can be identified by predetermining a threshold (preset angle) of the gravitational acceleration for the angle detection at the time of the speech act, for example to about −0.7 G.

Figure 7:
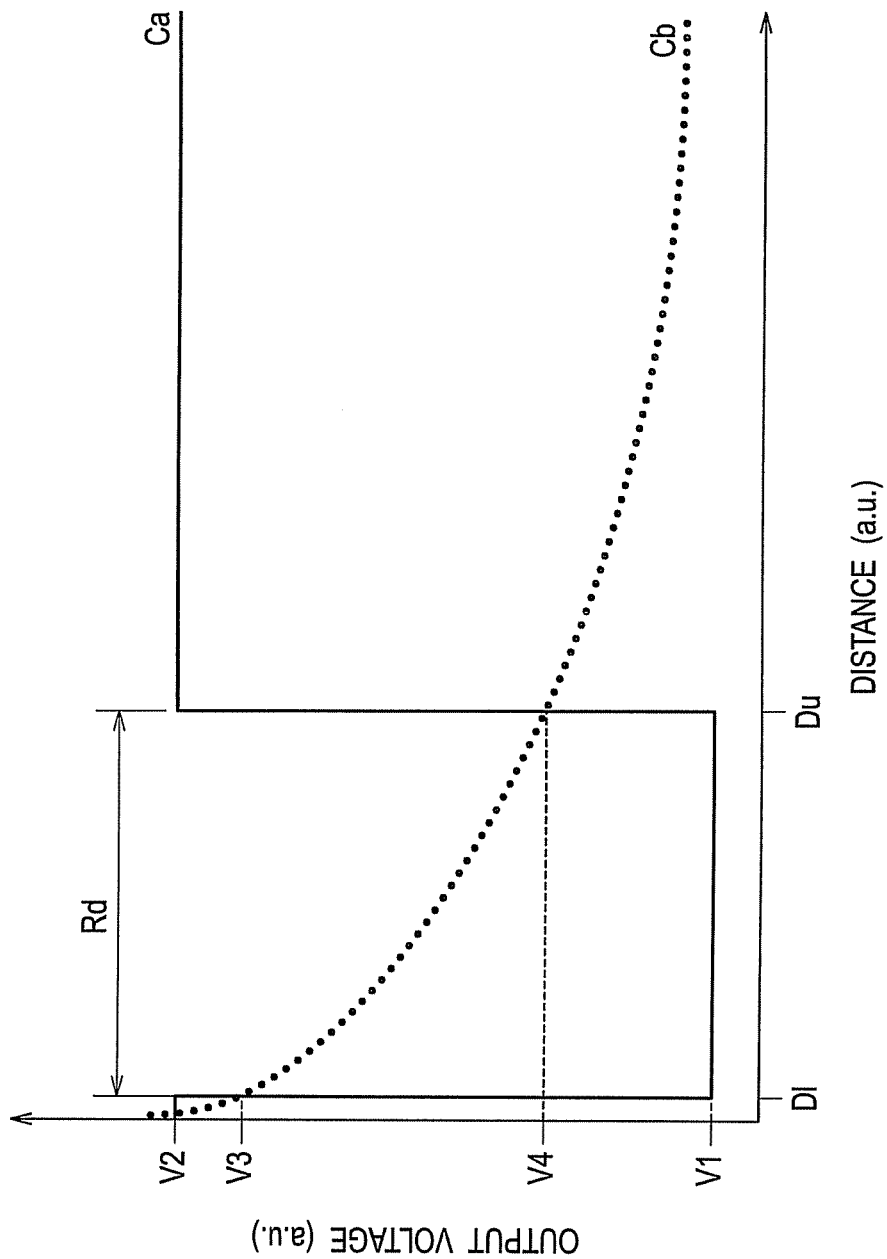
FIG. 7 is a graph showing an example of measurement result of the distance detection according to the first embodiment.

The distance detection unit 12, as shown in FIG. 2, is disposed near the speech input unit 14 and measures a distance (D) between the speech input unit 14 and the lips of the user. For measurement of the distance D, an optical sensor using a light sensitive element, such as a position sensitive device (PSD), a charge coupled device (CCD), a complementary metal-oxide semiconductor (CMOS) and the like, an ultrasonic sensor, and the like may be used. FIG. 7 shows an output form of the optical sensor using the PSD as the distance detection unit 12. As shown in FIG. 7, as the distance detection unit 12, an optical sensor having an output form Ca which has an output voltage V1 in a range of a preset distance Rd and an output voltage V2 out of the range of the preset distance Rd, may be used. Also, as the distance detection unit 12, an optical sensor having an output form Cb in which the output voltage changes depending on the distance, may be used. In the optical sensor having the output form Cb, for example, output voltages V3, V4 are provided corresponding to a lower limit distance D1 and an upper limit distance Du of the preset distance range Rd, respectively.

For the speech input unit 14, a microphone may be used. The speech input unit 14 may include an amplifier circuit of the microphone. The speech act determination unit 13 and the speech input switch unit 15 may be discrete hardware, or may be provided by virtually equivalent functions achieved by software, using the central operational processing unit (CPU) of the general purpose computer system. For the speech transmitting unit 16, a wireless or wire communication device and the like for transmitting the speech signal to an external speech processing unit may be used.

In the first embodiment, starting and stopping of the speech input may be automatically switched by a natural movement such that the user speaks by bringing the speech input device 10 close to the lips. Therefore, the user is not required to instruct starting and the finishing by button operation and the like in case of speech input. Thus, it is possible to prevent the user from forgetting to push the button.

In the usual speech input unit, only one of the angle detection unit 11 and the distance detection unit 12 is used to determine the speech act. For example, the speech act may be determined by measuring only the angle of the speech input device 10 using the angle detection unit 11. In this case, even if the user holds the speech input device 10 in hand and places the speech input device 10 in a separate place within the range of the preset angle, it is determined to be in speech act. Also, the speech act may be determined by measuring only the distance between the lips and the speech input unit 14 using the distance detection unit 12. In this case, when the speech input device 10 is placed somewhere, even if something except the lips, for example, a part of a body, such as a hand and the like, passes through the vicinity of the speech input unit 14, it is determined as speech act.

In the first embodiment, both of the angle detection unit 11 and the distance detection unit 12 are used to determine the speech act. Therefore, it is possible to solve the problem of the false recognition of the speech act, which occurs when only one of the angle detection unit 11 and the distance detection unit 12 is used.

Additionally, in the speech input, the distance between the speech input unit 14 and the lips has great influence on sound quality, sound quantity and the like. In the first embodiment, the range of the preset distance between the speech input unit 14 and the lips may be properly prescribed as usage. Therefore, it is possible to execute speech input with the proper distance between the speech input unit 14 and the lips, and to obtain the speech signal of high quality.

In addition, the angle detection and the distance detection, which are executed by the angle detection unit 11 and the distance detection unit 12, respectively, may be executed at the same time. Alternatively, after one of the angle detection and the distance detection results within the preset range, the other detection may be executed. For example, when an acceleration sensor is used for the angle detection unit 11 and a PSD is used for a light sensitive element of the distance detection unit 12, it is desirable to execute the distance detection when the angle becomes within the preset range while continuously executing the angle detection. For example, the electric power consumptions of the acceleration sensor and the distance sensor using the PSD are about 0.8 mW to about 1.5 mW, and n about 0.1 W to about 0.2 W, respectively. The electric power consumption of the acceleration sensor is extremely low as compared with the distance sensor. Therefore, even when the angle detection is continuously executed with the battery-operated speech input unit, it is possible to suppress decrease of the battery life. Since the light sensitive element and the like, which requires a large power consumption, is used in the distance sensor, it is desirable to execute the distance detection only when needed.

Figure 8:
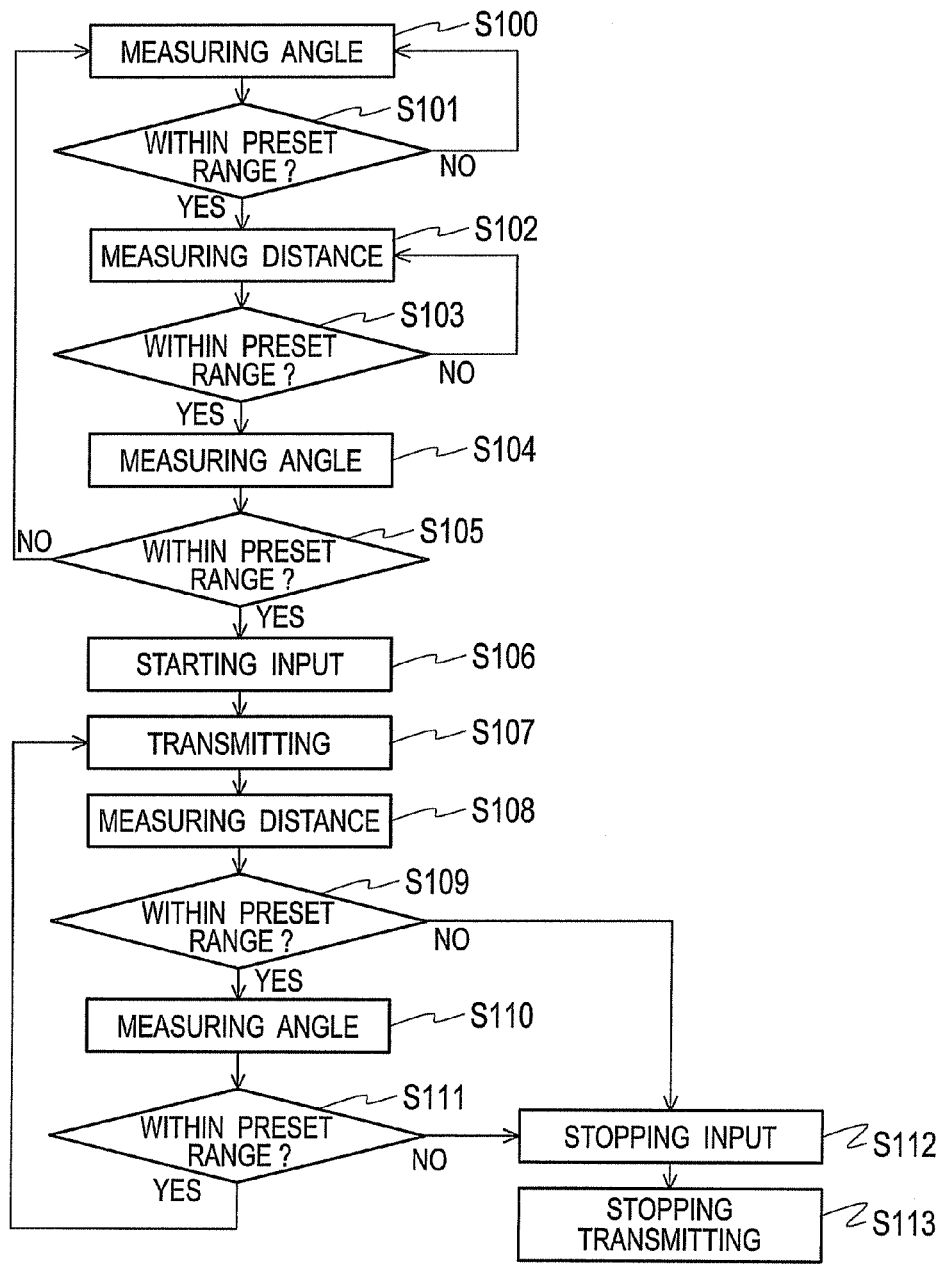
FIG. 8 is a flowchart showing an example of a procedure of the speech input device according to the first embodiment.

An operation of the speech input device 10 according to the first embodiment will be described with reference to the flowchart shown in FIG. 8. For the angle detection unit 11 and the distance detection unit 12, the acceleration sensor and the distance sensor using the PSD are used, respectively. In an initial state of the speech input device 10, speech input and amplification of the speech signal of the speech input unit 14 are off.

In Step S100, the angle detection unit 11 measures the angle between the speech input unit 14 and the lips of the user with a predetermined sampling frequency, for example, of 20 Hz. For example, the gravitational acceleration in the Z axis direction of the angle detection unit 11 is measured.

In Step S101, the speech act determination unit 13 determines whether the detected angle by the angle detection unit 11 is within the range of the predetermined preset angle. For example, the range of the preset angle is −0.7 G or more for the gravitational acceleration in the Z axis direction. When the detected angle is not within the range of the preset angle, the process returns to Step S100, and the angle measurement is continued. When the detected angle is within the range of the preset angle, the process advances to Step S102.

In Step S102, the distance detection unit 12 measures the distance between the speech input unit 14 and the lips of the user with a predetermined sampling frequency, for example, of 20 Hz.

In Step S103, the speech act determination unit 13 determines whether the detected distance by the distance detection unit 12 is within the range of the predetermined preset distance. For example, the preset distance is within the range of 2 cm and 10 cm. When the detected distance is not within the range of the preset distance, the process returns to Step S102, and the distance measurement is continued. When the detected distance is within the range of the preset distance, the process advances to Step S104.

In Step S104, the angle detection unit 11 executes the angle measurement. In Step S105, the speech act determination unit 13 determines whether the angle remains within the range of the preset angle. When the angle is out of the range of the preset angle, the process returns to Step S100, and the angle measurement is continued. When the angle remains within the range of the preset angle, the process advances to Step S106.

In Step S106, the speech act determination unit 13 notifies that the speech act has been started, to the speech input switch unit 15. The speech input switch unit 15 turns on the speech input unit 14 to start the speech input. The speech input unit 14 converts and amplifies the input speech to the speech signal. In Step S107, the speech transmitting unit 16 transmits the amplified speech signal to the external speech processing unit.

In Step S108, the distance detection unit 12 continues to measure the distance even during the transmission of the speech signal. In Step S109, the speech act determination unit 13 determines whether the detected distance remains within the range of the preset distance. When the detected distance is out of the range of the preset distance, in Step S112, the speech act determination unit 13 notifies ending of the speech act to the speech input switch unit 15. The speech input switch unit 15 turns off the speech input unit 14 to stop the speech input. In Step S113, the transmission of the speech signal is stopped concurrently with stopping of the speech input. When the detected distance is within the range of the preset distance, the process advances to Step S110.

In Step S110, the angle detection unit 11 executes the angle measurement. In Step S111, the speech act determination unit 13 determines whether the detected angle remains within the range of the preset angle. When the detected angle is out of the range of the preset angle, the speech input is stopped in Step S112, and at the same time, the transmission of the speech signal is stopped in Step S113. When the angle remains within the range of the preset angle, the process returns to Step S107, and the transmission of the speech signal is continued until at least one of the angle and the distance becomes out of the preset range.

In the first embodiment, at the occasion of the speech input, the user is not required to provide instructions of starting and stopping by a button operation. The speech input device 10 properly switches starting and stopping of the speech input by the natural speech act. Therefore, it is possible to decrease operations of the user at the occasion of the speech input. In particular, the inexperienced user can be easy to operate, and it is possible to prevent the user from forgetting to pushing the button. Also, the speech act is determined using both of the angle detection unit 11 and the distance detection unit 12. Therefore, it is possible to solve the problem of the false recognition of the speech act, which occurs in a case when only one of the angle detection unit 11 and the distance detection unit 12 is used. Moreover, the range of the preset distance between the speech input unit 14 and the lips can be properly prescribed as usage. Therefore, it is possible to execute speech input with the proper distance between the speech input unit 14 and the lips, and to obtain the speech signal of the high quality.

In addition, in Step S101, after the detected angle is determined to be within the range of the preset angle, the time that elapses before the detected distance runs within the range of the preset distance may be measured. When the detected distance does not run within the range of the preset distance within a predetermined time, measurement of the distance is stopped. For example, when the speech input device 10 remains untouched at the angle within the range of the preset angle, it is possible to prevent a malfunction in the case where something other than the lips comes close to the speech input unit 14.

Figure 9:
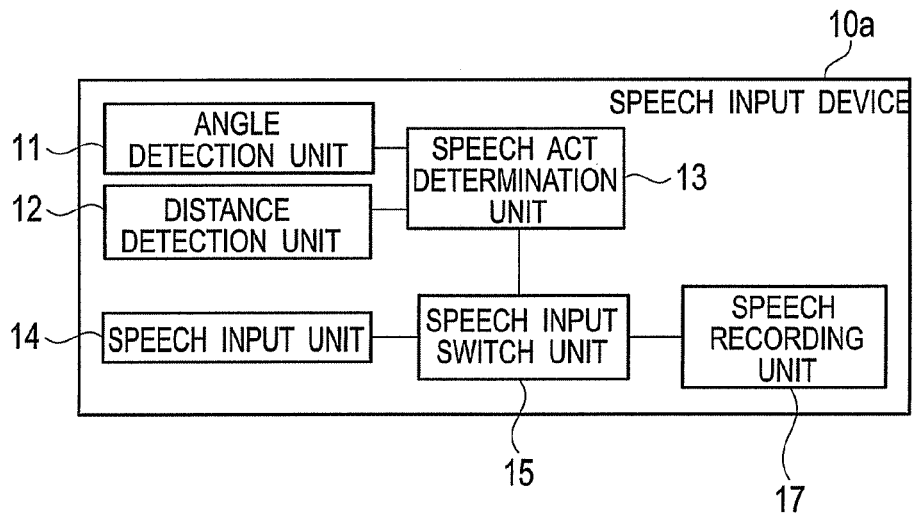
FIG. 9 is a block diagram showing another example of a speech input device according to the first embodiment.

Additionally, in the above mentioned description, the speech transmitting unit 16 for transmitting the speech signal to the external speech processing unit is provided in the speech input device 10. However, as shown in FIG. 9, a speech input device 10a having a voice recording unit 17 instead of the speech transmitting unit 16 may be used. In this case, the speech input device 10a is used as a voice recorder for recording the speech.

(Second Embodiment)

Figure 10:
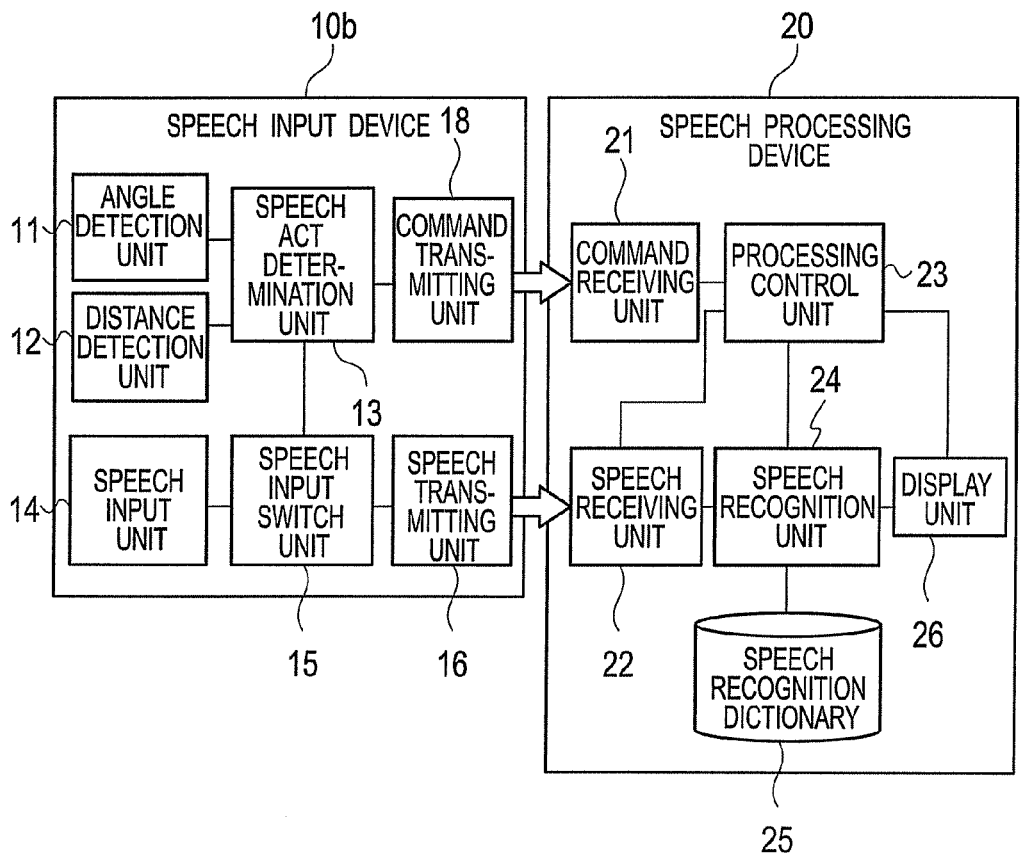
FIG. 10 is a block diagram showing an example of a speech recognition system according to a second embodiment.

As shown in FIG. 10, a speech recognition system according to a second embodiment of the present invention includes a speech input device 10b and a speech processing device 20. The speech input device 10b includes an angle detection unit 11, a distance detection unit 12, a speech act determination unit 13, a speech input unit 14, a speech input switch unit 15, a speech transmitting unit 16 and a command transmitting unit 18. The speech processing device 20 includes a command receiving unit 21, a speech receiving unit 22, a processing control unit 23, speech recognition unit 24, a speech recognition dictionary 25 and a display unit 26.

The speech input device 10b of the speech recognition system according to the second embodiment differs from the speech input device 10 according to the first embodiment in that the command transmitting unit 18 is provided. Other configurations are as in the first embodiment, so duplicated descriptions are omitted.

The command transmitting unit 18 of the speech input device 10b transmits a control command, which is created based on the speech act determined by the speech act determination unit 13, to the speech processing device 20. For example, as the control command, a start command or a stop command is transmitted based on beginning or ending of the speech act. Also, as the control command, an instruction command is transmitted based on the distance between the speech input unit 14 and the lips. For the command transmitting unit 18, a wireless or wire communication device may be used.

The speech receiving unit 22 of the speech processing device 20 receives the speech signal transmitted from the speech transmitting unit 16 of the speech input device 10b. The speech recognition dictionary 25 stores speech pattern data of a plurality of character strings, which are preliminarily registered for speech recognition processing. The speech recognition unit 24 executes speech recognition of the speech signal received by the speech receiving unit 22 and extracts a candidate character string corresponding to the recognized speech signal from among the registered character strings in the speech recognition dictionary 25. The display unit 26 displays the extracted candidate character string.

The command receiving unit 21 receives the control command transmitted from the command transmitting unit 18. The processing control unit 23 controls the processing to be executed in the speech processing device 20, based on the control command received by the command receiving unit 21.

For example, in the speech input device 10b, the speech act determination unit 13 determines the speech act of the user and transmits the determination result to the speech input switch unit 15 and the command transmitting unit 18. The speech input switch unit 15 turns on or off the speech input unit 14 based on the determination result and executes starting or stopping of the speech input. The speech transmitting unit 16 transmits the speech signal obtained by the speech input unit 14 to the speech processing device 20. The command transmitting unit 18 transmits the start command and the stop command to the speech processing device 20, based on the determination result.

Figure 11:
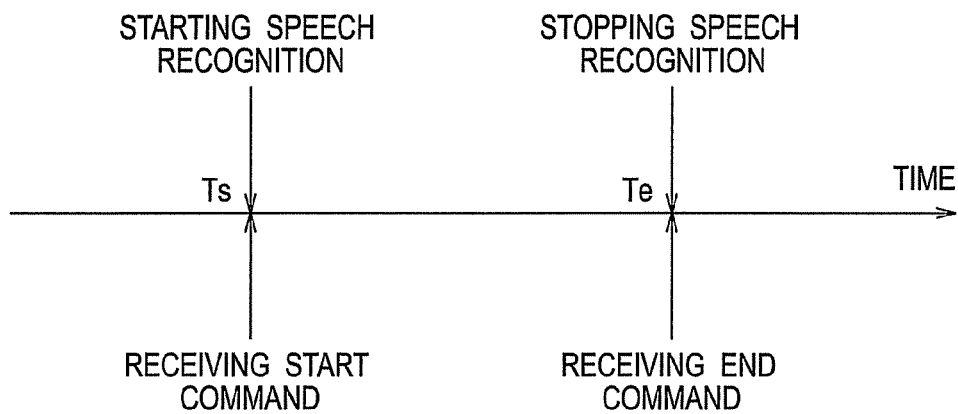
FIGS. 11 and 12 are diagrams used in an explanation regarding starting and finishing of speech recognition of the speech processing device according to the second embodiment.

As shown in FIG. 11, at a time Ts, the command receiving unit 21 of the speech processing device 20 receives the start command. The processing control unit 23 instructs the speech receiving unit 22 to start receiving the speech signal, based on the start command transmitted from the command receiving unit 21. Also, the processing control unit 23 instructs the speech recognition unit 24 to start the speech recognition of the speech signal obtained by the speech receiving unit 22. As the speech recognition, any speech recognition processing, such as an isolated word recognition, a connected speech recognition and the like, may be executed as usage.

At a time Te, the command receiving unit 21 receives the stop command. The processing control unit 23 instructs the speech receiving unit 22 to stop receiving the speech signal, based on the stop command transmitted by the command receiving unit 21. Also, the processing control unit 23 instructs the speech recognition unit 24 to stop the speech recognition.

After stopping the speech recognition, the speech recognition unit 24 analyzes the obtained speech signal and converts the speech signal into character data. For example, the candidate character string having high likelihood is extracted by comparing the speech signal and the speech pattern data of the character strings registered in the speech recognition dictionary 25. The display unit 26 displays the extracted candidate character string. The speech recognition executed in the speech recognition unit 24 can use the standard speech recognition process.

Figure 12:
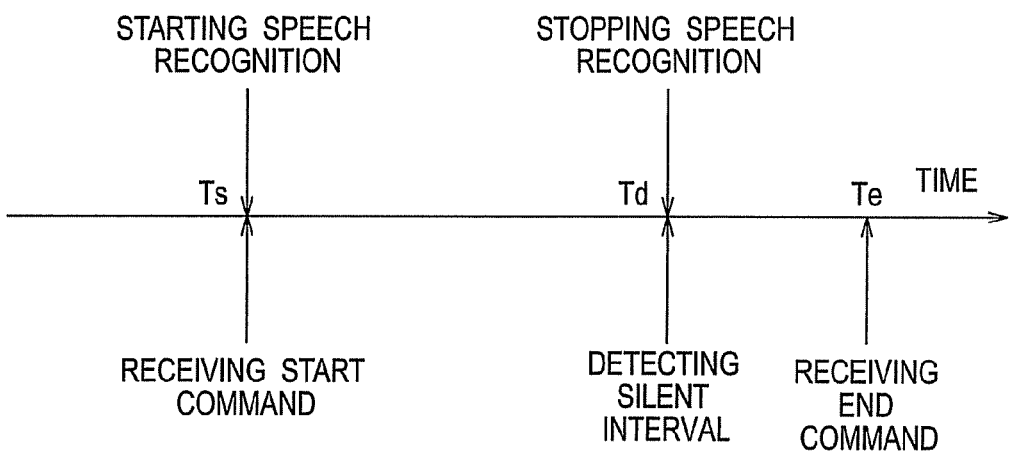

In addition, although the speech recognition is stopped when the stop command is received from the speech input device 10b, a method of stopping the speech recognition is not limited. For example, the speech recognition may be stopped when a silent interval for a given length of time is detected by the processing control unit 23 by monitoring a level of the speech signal which is received by the speech receiving unit 22. As shown in FIG. 12, as for a time Td of silent interval detection, when the silent interval is detected at a time Td prior to the time Te of receiving the stop command, the speech recognition is stopped at the time Td.

Figures 13, 14, 15:
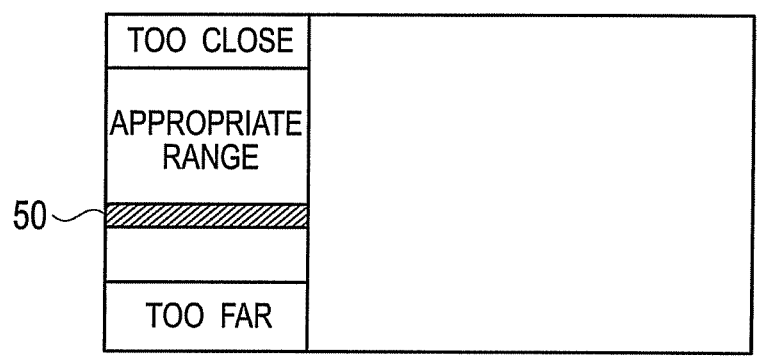
FIGS. 13 to 15 are diagrams showing examples of display contents of the display unit according to the second embodiment.

The control command, which controls the distance between the lips of the user and the speech input unit 14 of the speech input device 10b to the range of the preset distance, may be used. For example, when the speech act determination unit 13 determines that the detected distance by the distance detection unit 12 is far from the range of the preset distance, the determination result is sent to the command transmitting unit 18. The command transmitting unit 18 transmits the instruction command to bring the lips close to the speech input unit 14, to the speech processing device 20. As shown in FIG. 13, the processing control unit 23 of the speech processing device 20 instructs the display unit 26 to display "Bring Lips Close To Microphone" as an instruction message, based on the instruction command received by the command receiving unit 21.

When the speech act determination unit 13 determines that the detected distance by the distance detection unit 12 is closer than the range of the preset distance, the command transmitting unit 18 transmits the instruction command to separate the lips from the speech input unit 14, to the speech processing device 20. As shown in FIG. 14, the processing control unit 23 instructs the display unit 26 to display "Separate Lips From Microphone A Little" as an instruction message, based on the instruction command received by the command receiving unit 21.

Thus, the user is properly instructed within the range of the preset distance by the indication of the display unit 26. Therefore, it is possible to reduce a variation in the distance between the lips and the speech input unit 14, and to prevent a decrease in the speech recognition accuracy of the handheld speech input device lob.

In addition, as shown in FIG. 15, a distance meter indication may be used instead of the instruction message. The actual distance between the lips and the speech input unit 14 is indicated by a distance meter, which is displayed on the display unit 26, using a display mark 50. Also, the instruction message is not only displayed on the display unit 26, but also informed as a voice by voice synthesis and the like to the user.

Figure 16:
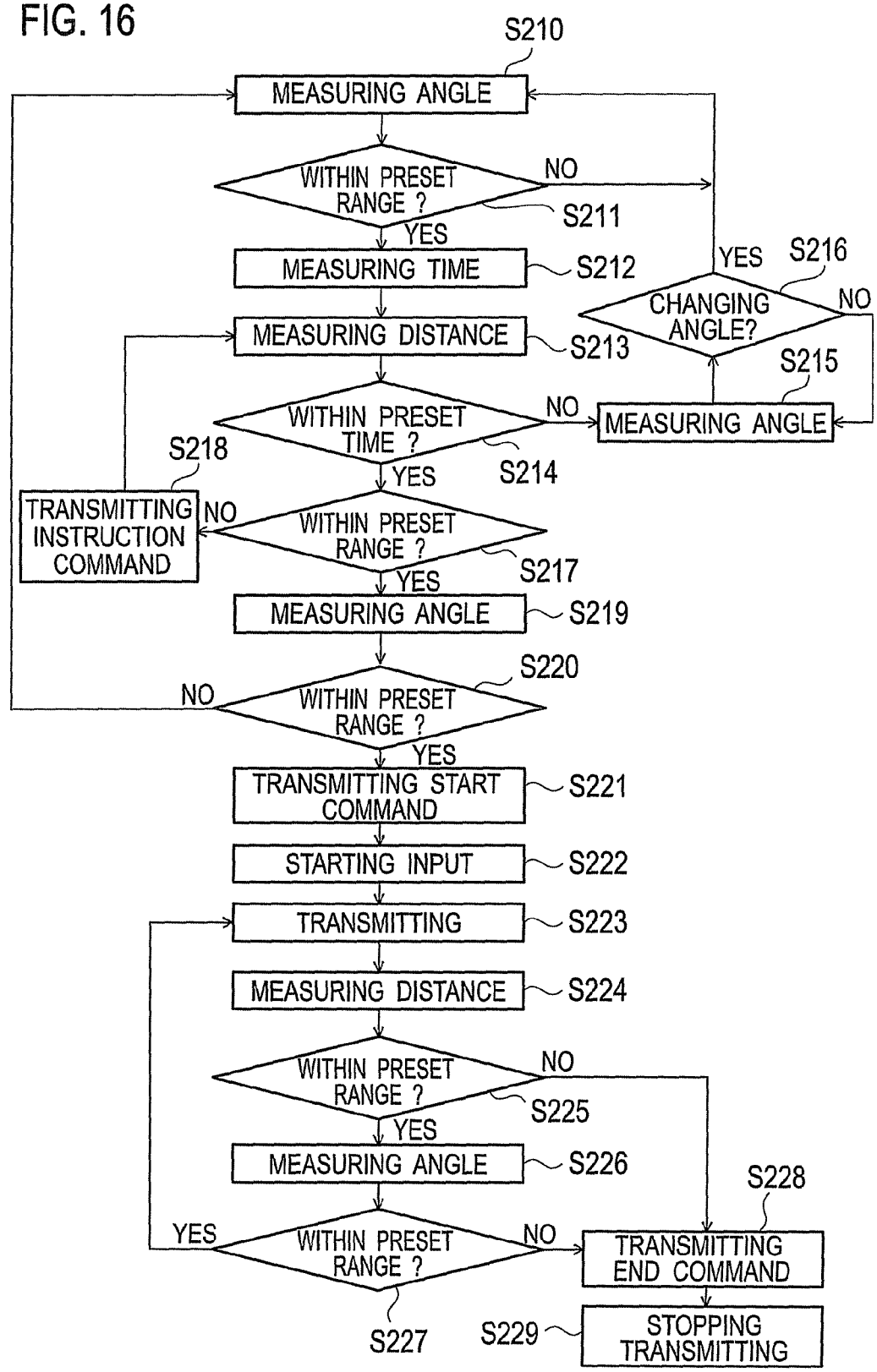
FIGS. 16 and 17 are flowcharts showing an example of a method for speech recognition according to the second embodiment.
Figure 17:
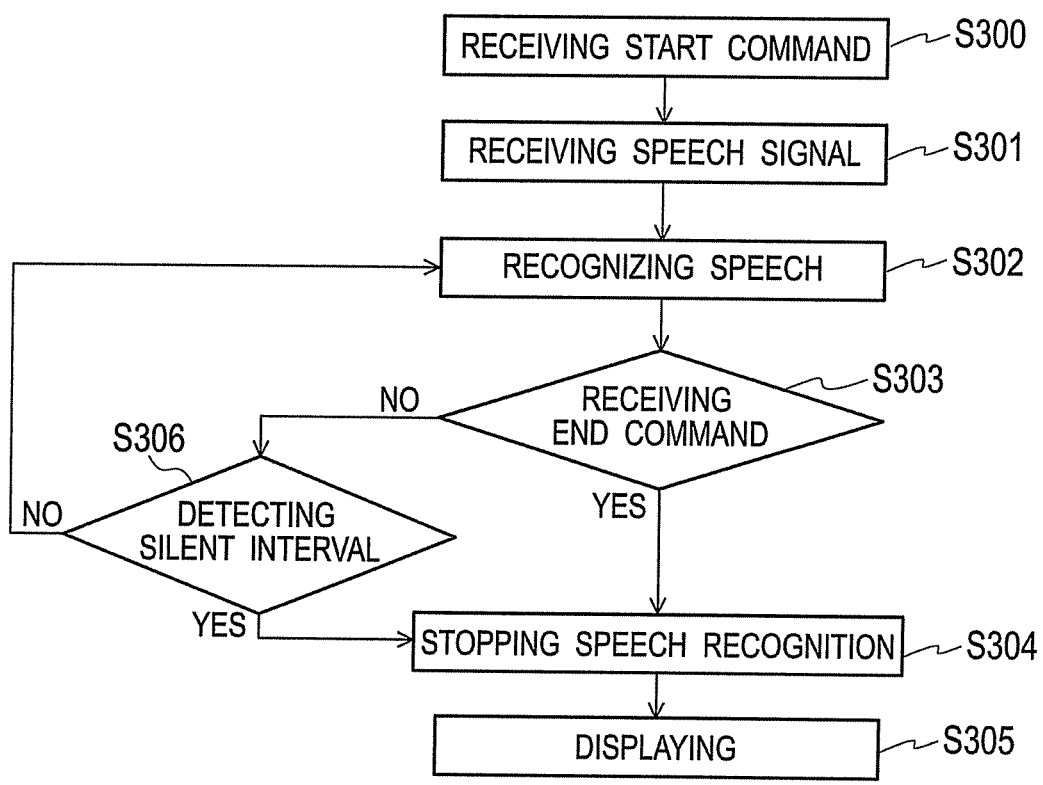

A speech recognition method according to the second embodiment will be described with reference to the flow-charts shown in FIGS. 16 and 17. In an initial state of the speech input device 10*b*, speech input and amplification of the speech signal of the speech input unit 14 are off. In an initial state of the speech processing device 20, the command receiving unit 21 and the speech receiving unit 22 are on standby for reception.

In Step S210, the angle detection unit 11 measures the angle of the speech input unit 14. In Step S211, the speech act determination unit 13 determines whether the detected angle by the angle detection unit 11 is within the range of the predetermined preset angle. When the detected angle is not within the range of the preset angle, the process returns to Step S210, and the angle measurement is continued. When the detected angle is within the range of the preset angle, in Step S212, the speech act determination unit 13 starts a time measurement.

In Step S213, the distance detection unit 12 measures the distance between the speech input unit 14 and the lips of the user. In Step S214, the speech act determination unit 13 determines whether the measured time is within a preset time. When the measured time exceeds the preset time, in Step S215, the angle measurement executed by the angle detection unit 11 is continued. In Step S216, when the speech act determination unit 13 recognizes that the detected angle changes, the process returns to Step S210. When the detected angle does not change, the process returns to the step S215, and the angle measurement is continued.

When the speech act determination unit 13 determines that the measurement time is within the preset time in Step S214, in Step S217, the speech act determination unit 13 determines whether the detected distance by the distance detection unit 12 is within the range of the preset distance. When the detected distance is not within the range of the preset distance, In Step S218, the command transmitting unit 18 transmits the instruction command, based on the detected distance. The user adjusts the distance between the lips and the speech input unit 14 in accordance with the instruction message and the like which is displayed on the display unit 26 of the speech processing device 20 based on the induction command. The process returns to the step S213, and the distance detection unit 12 continues to measure the distance.

When the detected distance is within the range of the preset distance, in Step S219, the angle detection unit 11 measures the angle. In Step S220, the speech act determination unit 13 determines whether the angle remains within the range of the preset angle. When the angle is out of the range of the preset angle, the process returns to the step S210, and the angle measurement is continued. When the angle remains within the range of the preset angle, the speech act determination unit 13 notifies that the speech act has been started, to the speech input switch unit 15 and the command transmitting unit 18.

In Step S221, the command transmitting unit 18 transmits the start command to the speech processing device 20. In Step S222, the speech input switch unit 15 turns on the speech input unit 14 to start the speech input. The speech input unit 14 converts and amplifies the input speech to the speech signal. In Step S223, the speech transmitting unit 16 transmits the amplified speech signal to the speech processing device 20.

In Step S224, the distance detection unit 12 continues to measure the distance even during the transmission of the speech signal. In Step S225, the speech act determination unit 13 determines whether the detected distance remains within the range of the preset distance. When the detected distance is out of the range of the preset distance, in Step S228, the command transmitting unit 18 transmits the stop command to the speech processing device 20. Also, the speech input switch unit 15 turns off the speech input unit 14, and the speech input is stopped. In Step S229, the transmission of the speech signal executed by the speech transmitting unit 16 is stopped.

When the detected distance in Step S224 is within the range of the preset distance, in Step S226, the angle detection unit 11 measures the angle. In Step S227, the speech act determination unit 13 determines whether the detected angle remains within the range of the preset angle. When the detected angle is out of the range of the preset angle, in Step S228, the command transmitting unit 18 transmits the stop command. In step S229, the transmission of the speech signal executed by the speech transmitting unit 16 is stopped. When the angle remains within the range of the preset angle, the process returns to Step S223, and the transmission of the speech signal is continued until at least one of the angle and the distance becomes out of the preset range.

In Step S300, the command receiving unit 21 of the speech processing device 20 receives the start command transmitted from the command transmitting unit 18 in Step S221. In Step S301, the speech receiving unit 22 receives the speech signal transmitted from the speech transmitting unit 16 in Step S223.

In Step S302, the processing control unit 23 sends the start command received by the command receiving unit 21 to the speech recognition unit 24 to start the speech recognition. Also, the processing control unit 23 monitors the level of the speech signal, which is received by the speech receiving unit 22.

In Step S303, the processing control unit 23 determines whether the command receiving unit 21 receives the stop command. When the stop command is not received, in Step S306, the processing control unit 23 determines whether the speech receiving unit 22 detects the silent interval. When the silent interval is not detected, the process returns to Step S302, and the speech recognition is continued.

When the stop command is received in Step S303, the speech recognition is stopped in Step S304. Also, when the silent interval is detected in Step S306, the speech recognition is stopped in Step S304. After the speech recognition is stopped, the result of the speech recognition is displayed in Step S305.

In the second embodiment, the user is not required to instruct starting and stopping by button operation and the like in case of speech input. Thus, it is possible to prevent the user from forgetting to push the button. Also, both of the angle detection unit 11 and the distance detection unit 12 are used to determine the speech act. Therefore, it is possible to solve the problem of the false recognition of the speech act, which occurs when only one of the angle detection unit 11 and the distance detection unit 12 is used. The malfunction can be determined based on the time of the distance measurement. Moreover, with the instruction command, it is possible to quickly provide properly in the range of the preset distance between the speech input unit 14 and the lips. Therefore, it is possible to execute speech input with the proper distance between the speech input unit 14 and the lips, and to obtain the speech signal of the high quality.

(Modification of the Second Embodiment)

Figure 18:
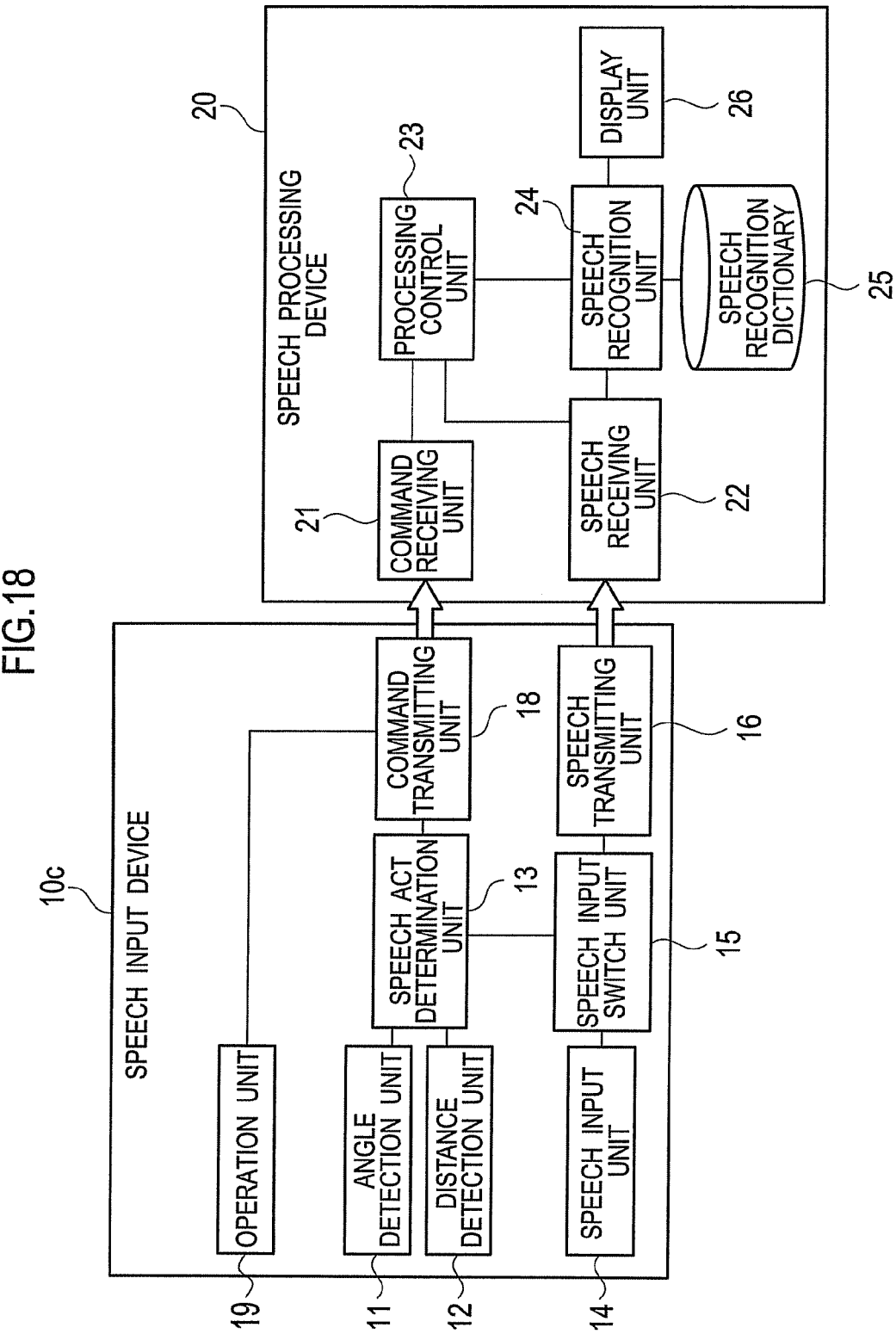
FIG. 18 is a block diagram showing an example of a speech recognition system according to a modification of the second embodiment.

A speech input system according to a modification of the second embodiment of the present invention includes a speech input device 10*c* and the speech processing device 20, as shown in FIG. 18. The speech input device 10*c* includes the angle detection unit 11, the distance detection unit 12, the speech act determination unit 13, the speech input unit 14, the speech input switch unit 15, the speech transmitting unit 16, the command transmitting unit 18 and an operation unit 19. The operation unit 19 instructs the command transmitting unit 18 to transmit an operation command as the control command and operates various services based on the result of the speech recognition of the speech processing device 20.

A speech recognition system according to the modification of the second embodiment differs from the second embodiment in that the operation unit 19 is provided in the speech input device 10c. Other configurations are as in the second embodiment, so duplicated descriptions are omitted.

Figure 19:
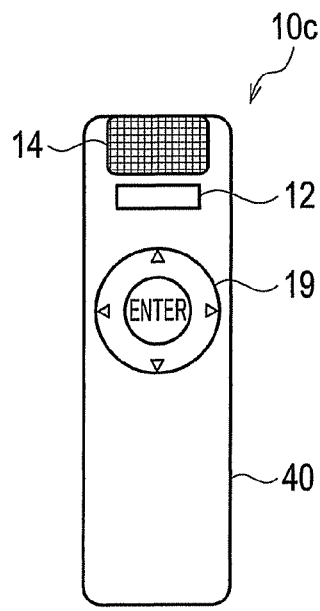
FIG. 19 is a diagram showing an example of installation of the speech input device according to the modification of the second embodiment.

The speech input device 10 is installed in the enclosure 40, as shown in FIG. 19. The distance detection unit 12, the speech input unit 14 and the operation unit 19 are disposed on the top surface of the enclosure 40. For example, a select button of left, right, up and down directions and an enter button are disposed in the operation unit 19. A select command as the operation command is transmitted by the operation of the selection button. An enter command as the operation command is transmitted by the operation of the enter button. The processing control unit 23 executes processing corresponding to the operation command based on the operation command received by the command receiving unit 21.

For example, when a plurality of select candidates are displayed on the display unit 26 of the speech processing device 20, a target candidate is selected from the select candidates by pushing down the select button of the operation unit 19. The operation to the selected target candidate is executed by pushing down the enter button.

Figure 20:
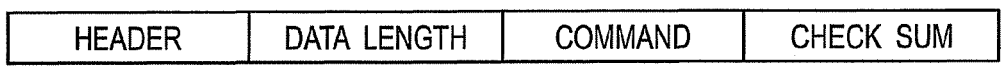
FIG. 20 is a diagram showing an example of a command packet used in the speech input device according to the modification of the second embodiment.

Also, one character may be assigned to each of the operation commands. Alternatively, as shown in FIG. 20, a packet having "Header", "Data Length", "Command", "Check Sum", and the like may be assigned to the operation command.

For example, the speech recognition unit 24 of the speech processing device 20 analyzes the obtained speech signal after stopping the speech recognition. The speech signal is compared with the speech pattern data having a plurality of character strings registered on the speech recognition dictionary 25, and a plurality of candidate character strings are extracted in order of likelihood. The extracted candidate character strings as the select candidates are displayed on the display unit 26.

Figure 21:
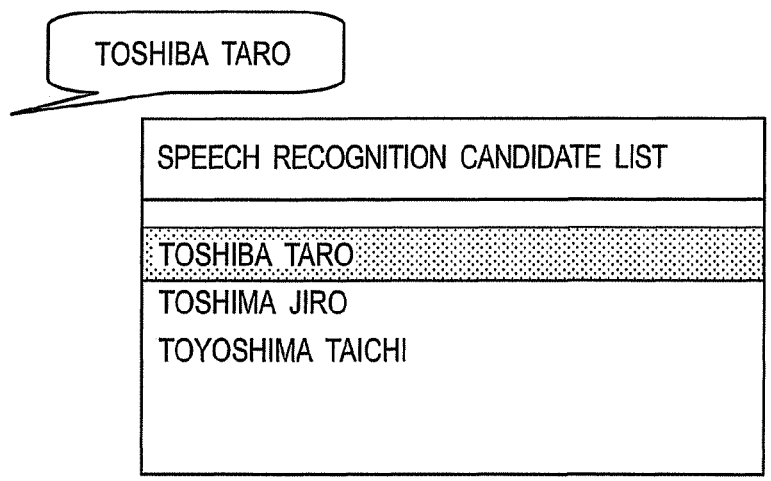

For example, a case of searching a television program with a keyword provided by executing the speech recognition will be described. As shown in FIG. 21, when the speech input is "toshiba taro", "Toshiba Taro" having the highest likelihood is displayed as the first candidate character string in a speech recognition candidate list. Additionally, the second and third candidate character strings are displayed in the speech recognition candidate list. A display condition for the candidate character string may be previously decided such that only a predetermined number of the candidate character strings in order of likelihood are displayed or the candidate character string having likelihood of a predetermined value or more are all displayed. When number of the candidate character strings to be displayed is large, the candidate character strings may be arrayed and displayed in a shape of a tile (two-dimensionally). When none of the candidate character strings conforms to the display condition of the candidate character string, "Speech Recognition Fail" and the like is displayed in the display unit 26. After displaying the candidate character strings, the process again returns to the command reception state, and selection of the candidate by the operation unit 19 or another input of the speech is waited.

As shown in FIG. 21, in the speech recognition candidate list shown in the display unit 26, "Toshiba Taro" serves as the target candidate in the select candidate character strings. On the contrary, when the select command is transmitted by pushing down "down direction" of the select button of the operation unit 19, the target candidate is moved from "Toshiba Taro" to "Toshima Jiro" of one level below in the select candidate character strings. In this way, the select button of left, right, up and down directions can be used in order to move the target candidate in the select candidate character strings.

Also, when the select command is transmitted while the enter button is pushed down in the situation in which "Toshiba Taro" is selected as the target candidate, searching of the television program is executed with "Toshiba Taro" as the keyword. As shown in FIG. 22, a list of the corresponding program candidates is displayed in the display unit 26. The detailed information of the target program candidate can be checked when the target program candidate, for example, "Appliance Chan" scheduled to broadcast from 19:00 on October 12 is selected by the select button from the program candidates shown in FIG. 22, and the enter button is pushed down. Moreover, the operation unit 19 can be used to execute operation, such as reservation and the like.

A speech recognition method according to the modification of the second embodiment will be described with reference to the flowchart shown in FIG. 23. The operations of the speech input device 10c are similar to those of the flowchart shown in FIG. 16.

In Step S300, the command receiving unit 21 of the speech processing device 20 receives the start command. In Step S301, the speech receiving unit 22 receives the speech signal. In Step S302, the processing control unit 23 starts the speech recognition. Also, the processing control unit 23 monitors the level of the speech signal which is received by the speech receiving unit 22.

In Step S303, the processing control unit 23 determines whether the command receiving unit 21 receives the stop command. When the stop command is not received, in Step S306, the processing control unit 23 determines whether the speech receiving unit 22 detects the silent interval. When the silent interval is not detected, the process returns to Step S302, and the speech recognition is continued.

When the stop command is received in Step S303, the speech recognition is stopped in Step S304. Also, when the silent interval is detected in Step S306, the speech recognition is stopped in Step S304. After the speech recognition is stopped, the result of the speech recognition is displayed in Step S305.

In Step S307, the operation unit 19 of the speech input device 10c creates the operation command. The operation command transmitted by the command transmitting unit 18 is received by the command receiving unit 21. The operation command is sent to the processing control unit 23.

In Step S308, the processing control unit 23 executes processing to the result of the speech recognition, based on the operation command.

As mentioned above, in the speech input device 10c, the operation command is created by the operation of the operation unit 19. However, the creation method of the operation command is not limited. For example, the operation command may be created by the speech input.

Furthermore, in the speech processing device 20, the speech recognition is executed. However, a speech recording unit may be installed in the speech processing unit so as to provide a recording function.

(Other Embodiments)

In the first and second embodiments of the present invention, starting of the speech input and transmission of the speech signal in the speech input devices 10, 10b and 10c are switched based on the determination result of the speech act. However, without switching starting of the speech input and transmission of the speech signal, the speech input may be always executed and the speech signal may be continuously transmitted. In this case, the determination result of the speech act is transmitted as the control command so as to switch the on and off states of the speech recognition.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A device for speech input installed in an enclosure, comprising:
   a speech input unit disposed on a surface of the enclosure, configured to convert a speech of a user to a speech signal;
   an angle detection unit disposed on the surface, configured to detect an angle of the speech input unit with respect to lips of the user, the angle being detected by measuring an acceleration applied to a direction perpendicular to the surface;
   a distance detection unit configured to detect a distance between the speech input unit and the user; and
   an input switch unit configured to control on and off of the speech input unit based on the angle and the distance, wherein:
      the input switch unit turns on the distance detection unit in response to a determination that the angle is within a preset angle range, and
      the input switch unit turns on the speech input unit in response to a determination that the distance is within a preset distance range, and a determination that the angle remains within the preset angle range.

2. A system for speech recognition, comprising:
   a speech input device installed in an enclosure; and
   a speech processing device;
   wherein the speech input device includes:
      a speech input unit disposed on a surface of the enclosure, configured to convert a speech of a user to a speech signal;
      an angle detection unit disposed on the surface, configured to detect an angle of the speech input unit with respect to lips of the user, the angle being detected by measuring an acceleration applied to a direction perpendicular to the surface;
      a distance detection unit configured to detect a distance between the speech input unit and the user;
      an input switch unit configured to control on and off of the speech input unit based on the angle and the distance, wherein the input switch unit turns on the distance detection unit in response to a determination that the angle is within a preset angle range, and the input switch unit turns on the speech input unit in response to a determination that the distance is within a preset distance range and a determination that the angle remains within the preset angle range;
      a speech transmitting unit configured to transmit the speech signal provided from the speech input unit to the speech processing device;
   and further wherein the speech processing device includes:
      a speech receiving unit configured to receive the speech signal transmitted from the speech transmitting unit;
      a speech recognition dictionary configured to store a plurality of character strings which are previously registered;
      a speech recognition unit configured to execute speech recognition of the received speech signal and to extract a candidate character string corresponding to the recognized speech signal from among the character strings;
      a display unit configured to display the candidate character string.

3. The system of claim 2, wherein, the speech input device further includes: a command transmitting unit configured to transmit a control command which controls processing by the speech processing device; and the speech processing device further includes: a command receiving unit configured to receive the control command; and a processing control unit configured to control the processing based on the control command.

4. The system of claim 3, wherein the control command is generated based on starting and ending of speech act of the user, which are determined based on the angle and the distance, and includes a start command and an end command for switching the speech recognition unit.

5. The system of claim 3, wherein the control command includes an instruction command instructing the user so that the detected distance is in a range of a preset distance.

6. The system of claim 3, wherein the speech input device further includes an operation unit configured to generate an operation command as the control command to execute an operation prescribed for the candidate character string displayed on the display unit.

7. A method for speech recognition implemented by a speech input device installed in an enclosure and a speech processing device, comprising:
   the speech input device executing processing which includes:
      converting a speech of a user to a speech signal by:
         detecting an angle of a speech input unit included in the speech input device with respect to lips of the user, the speech input unit disposed on a surface of the enclosure, the angle being detected by measuring an acceleration applied to a direction perpendicular to the surface;
         detecting a distance between the speech input unit and the user in response to a determination that the detected angle is within a preset angle range;
         determining that the speech of the user is started in response to the angle being determined to be within a preset angle range and the distance being determined to be within a preset distance range;
      transmitting the speech signal to the speech recognition device; and
   the speech recognition device executing processing which includes:
      displaying a candidate character on the speech recognition device by:
         receiving the speech signal;
         executing speech recognition of the receive speech signal; and extracting the candidate character string corresponding to the recognized speech signal from among a plurality of character strings which are previously registered, wherein detecting the distance is in response to detecting the angle to be within the preset angle range.

8. A device for speech input comprising:

a speech input unit configured to convert a speech of a user to a speech signal;

an angle detection unit configured to detect an angle of the speech input unit with respect to lips of the user;

a distance detection unit configured to detect a distance between the speech input unit and the user; and an input switch configured to control on and off of the speech input unit based on the angle and the distance, wherein the input switch unit turns on the distance detection unit in response to a determination that the angle is within a preset angle range, and the input switch unit turns on the speech input unit in response to a determination that the distance is within a preset distance range and a determination that the angle remains within the preset angle range.

* * * * *